(12) United States Patent
Yamakami (10) Patent No.: US 8,176,125 B2
(45) Date of Patent: May 8, 2012

(54) METHOD AND DEVICE FOR PROCESSING ELECTRONIC MAIL UNDESIRABLE FOR USER

(75) Inventor: Toshihiko Yamakami, Yokohama (JP)

(73) Assignee: Access Company, Ltd., Tokyo (JP)

(*) Notice: Subject to any disclaimer, the term of this patent is extended or adjusted under 35 U.S.C. 154(b) by 560 days.

(21) Appl. No.: 10/505,064

(22) PCT Filed: Feb. 19, 2003

(86) PCT No.: PCT/JP03/01831
§ 371 (c)(1),
(2), (4) Date: Aug. 18, 2004

(87) PCT Pub. No.: WO03/071753
PCT Pub. Date: Aug. 28, 2003

(65) Prior Publication Data
US 2005/0198142 A1    Sep. 8, 2005

(30) Foreign Application Priority Data
Feb. 22, 2002 (JP) ............................... 2002-046049

(51) Int. Cl.
*G06F 15/16* (2006.01)

(52) U.S. Cl. ....................................................... 709/206

(58) Field of Classification Search .................... 709/206
See application file for complete search history.

(56) References Cited

U.S. PATENT DOCUMENTS

| | | | | |
|---|---|---|---|---|
| 6,321,267 B1 * | 11/2001 | Donaldson | ..................... | 709/229 |
| 6,507,866 B1 * | 1/2003 | Barchi | ........................... | 709/207 |
| 2002/0116641 A1 * | 8/2002 | Mastrianni | ..................... | 713/201 |

FOREIGN PATENT DOCUMENTS

| | | |
|---|---|---|
| JP | 10-322384 A | 12/1998 |
| JP | 11-15756 A | 1/1999 |
| JP | 2000-032034 | 1/2000 |
| JP | 2000-163341 A | 6/2000 |
| JP | 2000-353133 A | 12/2000 |
| JP | 2001-94591 A | 4/2001 |
| WO | WO-01/89174 A2 | 11/2001 |
| WO | WO 01/89174 A2 * | 11/2001 |

OTHER PUBLICATIONS

Lee, Robert. "Spam Relay Checker." 3Dmail.com. 2001<http://web.archive.org/web/20010503061156/http://www.3dmail.com/spam/>.*

(Continued)

*Primary Examiner* — Hussein Elchanti
*Assistant Examiner* — Maceeh Anwari
(74) *Attorney, Agent, or Firm* — Morrison & Foerster LLP (57) ABSTRACT

Emails are received and the received emails are classified and accumulated based on relay path information contained in the header of each email. For each of the classified groups, a judgment is made according to a judgment rule including at least (1) the number of received emails per unit time is a first threshold or more and (2) the number of emails having an invalid destination address is a second threshold or more. For emails included in a classified group satisfying at least a prescribed number of items of the judgment rule, a mail process including (a) blockage of delivery to the user and (b) transmitting a pseudo error message replicating an undelivery mail to the source is carried out.

26 Claims, 3 Drawing Sheets

OTHER PUBLICATIONS

Sendmail.Org: "Anti-Spam provisions in Sendmail 8.8" Retrieved from the Internet: URL:http://replay.web.archive.org/20000301165049/http://www.sendmail.org/antispam.html>.*

Examination Report (Reason for Rejection) drafted Jan. 1, 2006, for related Japanese patent application, Serial No. 2003-570531, 6 pgs (with translation).

"Servey & Choice (Mail Filtering Soft)." (Sep. 20, 1999) Nikkei Communications, edited by Nikkei Business Publications, Inc., pp. 121-127.

"Software Design." (Oct. 18, 1998) edited by Gijutsu-Hyohron Co., Ltd., pp. 52-66.

"SurfControl SuperScout Email Filter—Policy and Deployment, White Paper—Apr. 2001." (Apr. 2001) SurfControl, Inc., pp. 1-4.

Supplementary Partial European Search Report mailed Nov. 14, 2005, for European patent application No. 03705338, filed Feb. 19, 2003, 4 pages.

Sendmail.org, "Anti-Spam Provisions in Sendmail 8.8," located at <http://web.archive.org/web/20010604000714/www/sendmail/org/antispam/html> visited on Oct. 27, 2005, 4 pages.

International Search Report mailed Jun. 10, 2003, for PCT patent application No. PCT/JP03/01831 filed on Feb. 19, 2003, 2 pages.

European Office Action mailed Oct. 16, 2009, for EP Application No. 03705338.6 filed Sep. 28, 2004, 4 pages.

* cited by examiner

METHOD AND DEVICE FOR PROCESSING ELECTRONIC MAIL UNDESIRABLE FOR USER

This application is a 35 U.S.C. §371 filing of International Patent Application No. PCT/JP03/01831, filed Feb. 19, 2003, which claims priority under 35 U.S.C. 119(a) of Japanese Application No. JP-2002-046049, filed Feb. 22, 2002, the entire contents of which are hereby incorporated by reference.

TECHNICAL FIELD

The present invention relates to an email (electronic mail) system, and in particular, to a process regarding emails that are undesirable to users of the email system.

BACKGROUND OF THE INVENTION

In electronic mail services provided by carriers such as cellular phone companies, an Internet mail address, using the phone number (e.g. "09011112222") of each subscriber as the account name and a name common to the carrier as the domain name is assigned to each subscriber as a default Internet mail address. Therefore, there exist some dealers or business entities generating destination addresses automatically by software by altering the phone number part of the Internet mail address sequentially or at random and sending messages (advertisement messages, etc.) to an indefinite number of subscribers by use of the generated destination addresses, by which large numbers of subscribers are receiving emails that are repeatedly sent from unfamiliar dealers, etc.

Such emails are of the type making the users feel troubled or annoyed. Electronic mails of the type include emails unilaterally sent to the users, such as the so-called spam mails, UCEs (Unsolicited Commercial Emails) and UBEs (Unsolicited Bulk Emails). Such emails making the users feel troubled or annoyed will hereinafter be called "undesirable emails" in this specification.

In cases where the carrier charges for email reception, each subscriber has to pay even when such undesirable emails are received. Further, in electronic mail services of cellular phones, etc., emails are generally delivered to the cellular phone, etc. one by one. Therefore, the subscriber is in formed of the mail reception on every email delivery from unfamiliar dealers and that is quite troublesome.

As a countermeasure against such undesirable emails, a service is being provided to the subscribers, in which each subscriber registers addresses or domain names for rejecting email reception, and email delivery from sources corresponding to the registered addresses or domain names is blocked. However, unless each subscriber registers the addresses or domain names for the delivery rejection by operating the cellular phone, etc., the delivery of undesirable emails can not be stopped. Thus, each subscriber has to register the delivery rejection addresses or domain names every time when undesirable emails start arriving and that is very troublesome to the subscribers.

In a technique disclosed in Japanese Patent Provisional Publication No. 2000-163341, an upper limit of the number of emails that can be received from the same email sender per day is set as a condition of email reception of each email user, by which reception of a large number of emails from the same email sender in a day is prevented.

The publication also discloses a technique for registering known (familiar) senders and restricting email reception from other senders.

PROBLEMS TO BE SOLVED BY THE INVENTION

However, the techniques proposed by Japanese Patent Provisional Publication No. 2000-163341 are those for eliminating the so-called spam mails for harassment, like delivering barrels of the same emails to the same email user and there by causing overflow to the use's mail box, delaying the user's email reception from the mail box, etc. Thus, the techniques disclosed in the publication can not serve as the countermeasure against the aforementioned undesirable emails since there are cases where a particular user receives a small number of undesirable emails (e.g., one undesirable email per day).

The size of each undesirable email is not necessarily large; however, such undesirable emails are delivered to many subscribers on the order of 1000, 10,000, etc. at once. Therefore, the transmission of undesirable emails, even if it is a small email to each particular subscriber, has immeasurable ill effects on the whole electronic mail service, such as increase in the traffic and the load on the mail server.

Further, in the case where the mail server restricts the email reception from senders other than the senders known (familiar) to the user, if the user forgets to register some of known (familiar) senders, even emails containing important messages might be rejected and that is awfully inconvenient to the user.

It is therefore the object of the present invention to provide a judging method, an email processing method, an email processing system, and a server device capable of letting the electronic mail service provider judge and find undesirable emails and properly deal with the undesirable emails, without causing an inconvenience or a load on the users.

DISCLOSURE OF THE INVENTION

In accordance with an aspect of the present invention, there is provided an email processing method for selecting emails of a prescribed type undesirable to users and processing the selected emails, comprising the steps of: receiving each email at a point on a path from a source of the email to a user and classifying and accumulating received emails based on prescribed information contained in the received emails; and judging whether the emails accumulated in each of classified groups are emails of the prescribed type or not according to a prescribed algorithm.

Since emails are classified based on the prescribed information and thereafter the judgment is made for each of the classified groups according to the prescribed algorithm, emails undesirable to the users can be judged and found securely.

The prescribed in formation can be information for specifying a group of emails having a high probability of having been transmitted by the same source.

The information for specifying a group of emails having a high probability of having been transmitted by the same source can be information on relaying of the emails.

The information on relaying can be information on relay paths of the emails, and the classification may be made by the relay paths.

Alternatively, the information on relaying can be server names or domain names of relay devices on relay paths of the emails, and the classification may be made by the server names or domain names.

The judgment on whether emails of the prescribed type or not according to a prescribed algorithm may include ranking in regard to whether emails of the prescribed type or not.

The email processing method may further comprise the step of executing different processes to the emails of different classified groups, respectively, depending on the result of the ranking.

The emails of each of the classified groups may be ranked by the prescribed algorithm among three ranks: emails of the prescribed type, emails that might be of the prescribed type, and normal emails.

The number of ranks in the ranking may be variable.

The prescribed algorithm may include threshold values corresponding to the ranks, to be used as criteria for ranking the emails of each of the classified groups, and the threshold values maybe variable.

The prescribed algorithm may be alterable.

In the email processing method, the prescribed algorithm may include judgment on whether or not the emails accumulated in each of the classified groups satisfy each item of a judgment rule containing at least one of the following items:

(1) the number of received emails per unit time is a first threshold or more, and (2) the number of emails having an invalid destination address is a second threshold or more, and judge whether the emails of each of the classified groups are emails of the prescribed type or not based on the result of the judgment.

Undesirable emails tend to be transferred to a destination mail server in large quantities, through the same relay path or from the same source. Therefore, by receiving the emails transferred to the destination mail server or emails (undeliverable mails, etc.) returned from the destination, classifying the received emails, and making a judgment employing the judgment rule as above, nuisance emails can be judged and found securely.

In the email processing method, the prescribed algorithm may include judgment on whether or not the emails accumulated in each of the classified groups satisfy each item of a judgment rule containing at least one of the following items:

(1) the number of received emails per unit time is a first threshold or more, (2) the number of emails having an invalid destination address is a second threshold or more, (3) the source address is invalid, (4) the degree of difference of the destination address between emails in the classified group is a third threshold or more, (5) the mail text contains prescribed contents, and (6) the mail text contains a prescribed URL, and judge whether the emails of each of the classified groups are emails of the prescribed type or not based on the result of the judgment.

The degree of difference of the destination address in the item (4) of the judgment rule may be calculated based on Hamming distance between destination address codes.

The email processing method may further comprise the step of continuing the reception, classification and accumulation of the emails until an accumulation condition, specifying at least one of accumulation time and the number of accumulated emails, is satisfied.

The email processing method may further comprise the step of preventing transmission of information on each user (at the destination of each email judged to be of the prescribed type) to the source of the email of the prescribed type.

The email processing method may further comprise the step of executing a process including at least one of the following items for the emails judged to be of the prescribed type:

(a) blockage of delivery to the user, (b) transmitting a pseudo error message, replicating an undelivery mail which is returned by a mail server to the source when undeliverable, to the source, (c) deletion, (d) blocking an undeliverable mail from being returned to the source when the undelivery mail is transmitted by a prescribed mail server, (e) transmitting a warning message to the source, (f) preserving information on the emails of the classified group, (g) inquiring of each user whether to deliver each email of the classified group or not and processing the email according to a reply of the user to the inquiry, (h) rejection of domain name service regarding a prescribed mail server requested by a device corresponding to the source of the emails of the classified group, and (i) rejection of requests for connection to a prescribed mail server made from the IP address of a device corresponding to the source of the emails of the classified group.

In this case, annoyance of the users can be prevented by the delivery blockage, etc. in regard to emails of the classified groups that can be judged as undesirable emails.

The emails may include undeliverable mails each of which is transferred from a prescribed mail server to the source when an email to a user at the destination is undeliverable.

In accordance with another aspect of the present invention, there is provided an email processing method, in which emails are received while classifying and accumulating the received emails based on information on a source and/or relaying of email contained in the received emails until an accumulation condition, specifying at least one of accumulation time and the number of accumulated emails, is satisfied. Whether or not the emails accumulated in each of classified groups satisfy each item of a judgment rule containing at least one of:

(1) the number of received emails per unit time is a first threshold or more, (2) the number of emails having an invalid destination address is a second threshold or more, (3) the source address is invalid, (4) the degree of difference of the destination address between emails in the classified group is a third threshold or more, (5) the mail text contains prescribed contents, and (6) the mail text contains a prescribed URL.

according to a judgment rule application condition specifying which items of the judgment rule should be applied. Therefore, the number of satisfied items in the items of the judgment rule can be obtained for each of the classified groups, and whether the emails of each classified group are undesirable emails or not can be determined based on the number of satisfied items of the judgment rule. Further, whether or not each of the classified groups obeys a comprehensive judgment rule (which employs the number of satisfied items in the items specified by the judgment rule application condition as its condition of judgment) is judged, and a prescribed mail process including at least one of the following items is executed for the emails of the classified groups judged to obey the comprehensive judgment rule:

(a) blockage of delivery to the user, and (b) transmitting a pseudo error message, replicating an undeliverable mail which is returned by a mail server to the source when undeliverable, to the source. Therefore, annoyance of the users can be prevented by the delivery blockage, etc. in regard to emails of the classified groups that can be judged as nuisance emails.

The email processing method may further comprise the steps of: collecting statistics on the result of the judgment on the comprehensive judgment rule by executing the sequence of processes described in the email processing method at least once; and setting or altering contents of at least one of the accumulation condition, the judgment rule, the judgment rule application condition and the comprehensive judgment rule depending on the collected statistics. For example, the above conditions/rules can be altered so that the ratio of the number of emails judged by the comprehensive judgment as nuisance emails to the total number of received emails will be a ratio that suits the feelings of average users.

The email processing method may further comprise the step of receiving input for setting or altering contents of at least one of the accumulation condition, the judgment rule, the judgment rule application condition and the comprehensive judgment rule via a user interface.

In the email processing method, classified groups corresponding to a prescribed exceptional rule may be excluded from the targets of the prescribed mail process even when the classified groups obey the comprehensive judgment rule.

The prescribed exceptional rule may include at least one of the address of a source to be excepted, the domain name of a source to be excepted, a time slot in which the prescribed mail process is not executed, and a time period in which the prescribed mail process is not executed.

The email processing method may further comprise the steps of: acquiring a delivery rejection condition, containing at least one of a domain name and a source address for rejecting email delivery, from a prescribed server when a user has registered the delivery rejection condition with the prescribed server; and determining classified groups as the targets of the prescribed mail process based on the acquired delivery rejection condition. Therefore, response of the users to the delivered emails can be incorporated in the email processing method.

In the email processing method, the number of satisfied items of the judgment rule in the items specified by the judgment rule application condition may be defined in the comprehensive judgment rule as a factor for ranking. Each of the classified groups may be ranked according to the comprehensive judgment rule so that the rank will become higher as the number of satisfied items of the judgment rule gets larger, and the prescribed mail process may executed at least for emails of a classified group that is ranked among the highest rank by the ranking.

In the email processing method, the accumulation condition may be altered and the sequence of processes described in the email processing method may be continued further for at least one classified group that is not ranked among the highest rank by the ranking. For example, by continuing the observation while altering the accumulation condition to a stricter one, nuisance emails can be found more effectively.

In accordance with another aspect of the present invention, there is provided a system for selecting emails of a prescribed type undesirable to users and processing the selected emails, comprising: a mail classification system for receiving emails and classifying and accumulating the received emails based on prescribed information contained in the received emails; a judgment system for judging whether the emails accumulated in each of classified groups are emails of the prescribed type or not according to a prescribed algorithm; and an email processing system for executing a process based on the result of the judgment.

In accordance with another aspect of the present invention, there is provided a server device for selecting emails of a prescribed type undesirable to users and processing the selected emails, comprising: a mail classification unit for receiving emails and classifying and accumulating the received emails based on prescribed information contained in the received emails; a judgment unit for judging whether the emails accumulated in each of classified groups are emails of the prescribed type or not according to a prescribed algorithm; and an email processing unit for executing a process based on the result of the judgment.

BEST MODE FOR CARRYING OUT THE INVENTION

Referring now to the drawings, a description will be given in detail of preferred embodiments in accordance with the present invention.

Figure 1:
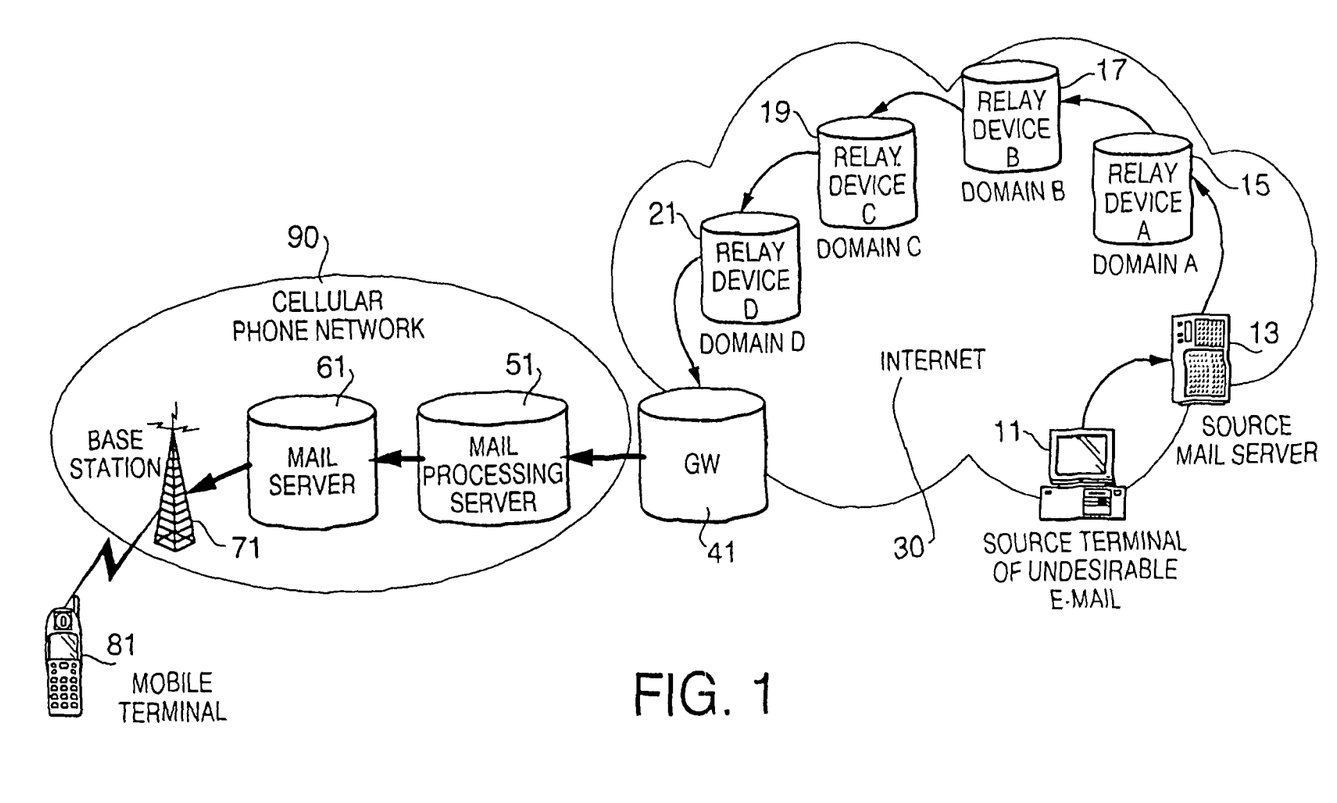
FIG. 1 is a schematic diagram showing a system employing a mail processing server in accordance with an embodiment of the present invention while indicating a delivery path of an email transmitted by a source.

The following explanation of the embodiments of the present invention will be given on a mail processing system in which a mail processing server 51 having the function of selecting "undesirable emails" and processing them is placed between an ordinary mail server 61 and the Internet 30. As shown in FIG. 1, the mail processing server 51 is placed between a gateway 41 and the mail server 61 so as to judge whether emails transmitted to the mail server 61 contain undesirable emails or not. The mail processing server 51 is capable of blocking the emails judged to be undesirable emails from being delivered to the mail server 61, for example.

In the following, the operation of the system when an email is transmitted from a source terminal 11 (a terminal sending the email) to a mobile terminal 81 (a terminal of a user of the mail server 61) will be explained referring to FIG. 1. In FIG. 1, the source terminal 11 is connected to the Internet 30, therefore, the email sent from the source to the destination (mobile terminal 81) is transferred from a source mail server 13 to the mail server 61 according to, for example, the SMTP (Simple Mail Transfer Protocol) which is an application operating on the Internet-standard TCP/IP. There exist various modes (pushing notifications only, pushing all the mail contents, etc.) as the mail delivery modes from the mail server 61 to the mobile terminal 81. In the embodiments of the present invention, any of the various delivery modes can be employed.

Here, we assume that an email from the source terminal 11 is delivered along a relay path which is indicated by the arrows in FIG. 1. Thus, the email from the source terminal 11 is transferred to the gateway 41 which intermediates between the Internet and a cellular phone network, via the source mail server 13 and relay devices A, B, C and D. The email is there after delivered from the gateway 41 to the mobile terminal 81 of the user via the mail processing server 51, the mail server 61 and a base station 71. Each relay device A, B, C, D transfers the email to a next relay device that is appropriate for the mail transfer to the destination. The domain names of the relay devices A, B, C and D are assumed to be "A", "B", "C" and "D", respectively. The important point to note is that in the case where emails are transmitted from the same source to the same user via the Internet as above, the relay paths for the emails can be regarded to be the same. Especially when vast amounts of emails are transmitted in a short time, the probability becomes still higher.

The email is composed of a message header and a message body. Therefore, by letting the mail processing server 51 receive the email transferred toward the mail server 61 and analyze the message header, the relay path of the email (relay device A→B→C→D in the example of FIG. 1) can be learned. Examples of fields included in the message header is as below.

From: (source address)
To: (destination address)
Received: (names of relay devices that relayed the email)
Subject: (subject (title) of the message)

Figure 2:
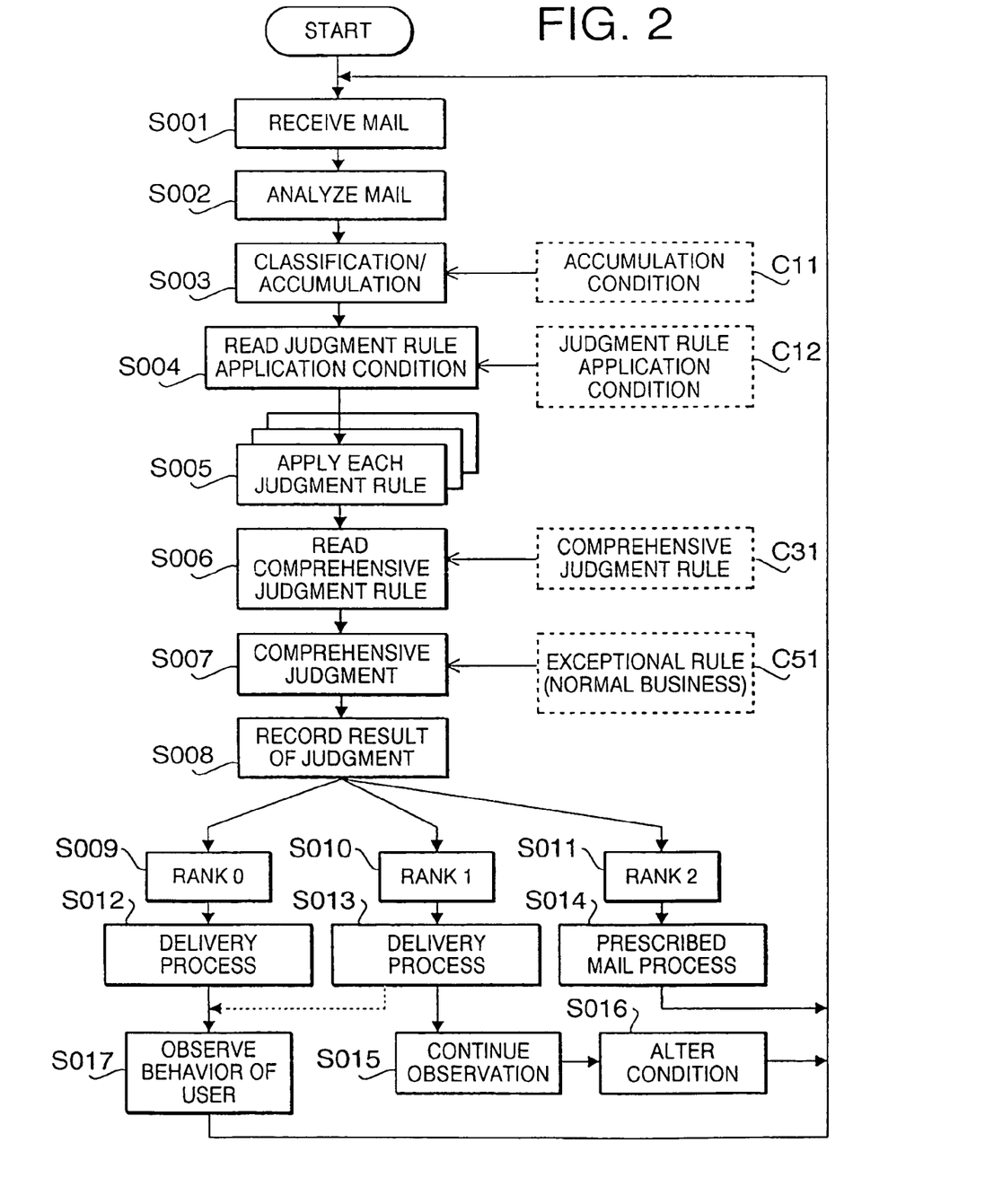
FIG. 2 is a flowchart showing a mail process which is executed by the mail processing server shown in FIG. 1.

FIG. 2 is a flowchart showing the flow of a process for the undesirable emails which is conducted by the mail processing server. The details of the operation of the mail processing server 51 will be explained below referring to the process flow of FIG. 2.

First, the mail processing server 51 receives an email transferred from the gateway 41 to the mail server 61 in the network (S001).

Subsequently, the header message of the received email is analyzed (S002) and the email is classified according to a prescribed classification rule (S003). As the classification rule for the step S003, the following rules can be employed:
b1. relay path
b2. relay devices (server names, domain names)
b3. source (domain name, address)
b4. keyword in the text The "b1. relay path" is information on the relay order by relay devices. In the case of FIG. 1, the relay order is A→B→C→D, for example. By employing the "b1. relay path" as the classification rule, the emails can be classified according to the relay path. As mentioned above, the relay paths of emails transferred from the same source to the mail server 61 can be regarded to be the same. Therefore, it should be noted that the classification of emails by the rule "b1. relay path" is highly effective as a means for finding out the sources of undesirable emails.

The "b2. relay devices" is a rule for classification by the server names or domain names of relay devices. The "b3. source" is a rule for classification by the domain name or address of the source. The "b4. keyword in the text" is a rule for classification by keywords in the text of the mail.

Here, the "b1. relay path" and "b2. relay devices" can be regarded as information on the relaying of email which is contained in the header message, and the "b3. source" can be regarded as information on the source which is contained in the header message. The "b4. keyword in the text" also contains URL, etc. that can be used as information regarding the source.

The following explanation will be given assuming that the "b1. relay path" is employed as the classification rule, for example. In the step S003, the email classified by the classification rule is accumulated according to an accumulation condition C11 (the number of mails to be accumulated or accumulation time), that is, the sequence of mail reception (S001), mail analysis (S002) and classification/accumulation (S003) is repeated until the accumulation condition is satisfied.

After continuing the mail classification/accumulation until the accumulation condition is satisfied, a judgment rule application condition C21 is read out (S004) and whether each judgment rule is "obeyed" or not is judged for each of the classified groups, according to the judgment rule application condition (S005). Incidentally, at this stage, comprehensive judgment on whether emails of each classified group are undesirable emails or not is not made yet. The judgment rule application condition C21 is a condition defining which ones of applicable judgment rules (e.g. j1-j6 listed below) are employed.

j1. The number of received mails per unit time is equal to or larger than a first threshold.
j2. The number of undeliverable mails per unit time is equal to or larger than a second threshold (whether undeliverable or not is judged by whether the destination address is valid or not).
j3. The source address is invalid.
j4. The degree of difference of addresses with regard to consecutive mails obtained based on the Hamming distance between the destination address codes is equal to or larger than a third threshold.
j5. The mail text contains prescribed contents.
j6. The mail text contains a prescribed URL.

The above judgment rules j1-j6 will be explained below.

The judgment rule "j1. The number of received mails per unit time is equal to or larger than a first threshold" means that the number of emails received per unit time is obtained in regard to emails accumulated in a classified group and whether or not the obtained number of reception is the first threshold or more is judged. Since large numbers of undesirable emails are transferred through the same relay path in a short time as mentioned above, whether mails included in a classified group are undesirable emails or not can be judged very effectively by use of this judgment rule.

The judgment rule "j2. The number of undeliverable mails per unit time is equal to or larger than a second threshold" means undeliverable mails (emails having an invalid destination address) included in the emails accumulated in a classified group are counted and whether or not the number of reception of the undeliverable mails per unit time is the second threshold or more is judged. As mentioned above, some of the undesirable emails are generated by automatically generating the destination address on a computer sequentially or at random. Thus, when such undesirable emails are accumulated, the number of undeliverable mails (having invalid destination addresses) in the classified group increases. Therefore, the judgment on whether undesirable emails or not can be made by use of the judgment rule j2.

The judgment rule "j3. The source address is invalid means that whether the source address included in the header message of each of the accumulated mails is invalid (including cases where no source address is described in the header message) or not is checked. Some senders of undesirable emails transmit emails with the header message including no source address or invalid source address so that the source address of the sender will not be known. Therefore, the judgment on whether undesirable emails or not can be made by use of the judgment rule j3.

The judgment rule "j4. The degree of difference of addresses with regard to consecutive mails obtained based on the Hamming distance between the destination address codes is equal to or larger than a third threshold means that the degree of difference of destination addresses is judged between accumulated mails. In cases where vast amounts of undesirable emails are transmitted at once, the degree of difference of destination addresses becomes high, and the undesirable emails are characterized by an increase in the Hamming distance between the destination addresses of accumulated emails. Therefore, the judgment on whether undesirable emails or not can be made by use of the judgment rule j4.

The judgment rule "j5. The mail text contains prescribed contents means a judgment on whether or not expressions corresponding to an undesirable email are contained in the mail text. The judgment rule "j6. The mail text contains a prescribed URL means a judgment on whether or not a URL corresponding to an undesirable email is contained in the mail text.

The judgment rule application condition C21 is a condition defining which ones of the above judgment rules j1-j6 are employed. The judgment rule application condition C21 may also contain actual values that can be employed as the first threshold, the second threshold and the third threshold.

Returning to FIG. 2, in step S006, a comprehensive judgment rule C31 is read out and then the comprehensive judgment on whether emails of each classified group are undesirable emails or not is made (S007). The comprehensive judgment rule C31 is a rule which associates the judgment results by the judgment rule application condition C21 with the comprehensive judgment (rank 0, rank 1, rank 3). In other words, the degree of annoyance is ranked among rank 0, rank 1 and rank 2 depending on the judgment result by each judgment rule by use of the comprehensive judgment rule C31.

To the comprehensive judgment of the step S007, exceptional rules C51 regarding normal business entities, etc. are applied so that emails from normal business entities, etc. will not be judged as undesirable emails. In the exceptional rules C51, addresses, domains, etc. of normal business entities (normal advertising agencies, etc.), addresses, domains, etc. which are used in letters of acceptance from universities, etc. can be included. Further, time slots or time periods (days, weeks, months) in which email delivery is specially permitted may also be included in the exceptional rules.

After the comprehensive judgment (S007) is made, the result of the judgment is recorded (S008). The comprehensive judgment is made based on the comprehensive judgment rule C31. An example of the comprehensive judgment rule C31 will be shown in the following Table 1. In Table 1, a classified group that can be judged not to be undesirable emails since the number of judgment rules that are "obeyed" is less than X is ranked among "rank 0". A classified group that can be judged to be emails that might be undesirable emails since the number of "obeyed" judgment rules is X or more and less than Y (X<Y) is ranked among "rank 1". A classified group that can be judged to be undesirable emails since the number of "obeyed" judgment rules is Y or more is ranked among "rank 2".

TABLE 1

| THE NUMBER OF "OBEYED" JUDGMENT RULES | RANK |
|---|---|
| THE NUMBER OF "OBEYED" JUDGMENT RULES ≧ Y | RANK 2 |
| Y > THE NUMBER OF "OBEYED" JUDGMENT RULES ≧ X | RANK 1 |
| X > THE NUMBER OF "OBEYED" JUDGMENT RULES | RANK 0 |

For the classified groups judged "rank 0" (regarded as non-undesirable emails), a delivery process toward the mail server 61 is carried out (S012). The classified groups judged "rank 0" may be discarded after the delivery. Meanwhile, for the classified groups judged "rank 1", a delivery process to the mail server 61 is carried out (S013) and thereafter the observation is continued (S015) leaving the classified groups just as they are. Specifically, with the classified groups judged "rank 1" left just as they are, the process from the step S001 is continued with the accumulation condition, the judgment rules and/or the judgment rule application condition altered to stricter ones, for example. By such a configuration, the undesirable emails can be located securely.

In the case where the result of the comprehensive judgment is "rank 0" or "rank 1", it is possible to observe the behavior of the users (S017) and incorporate the result of observation into the accumulation condition, the judgment rules and the judgment rule application condition. Specifically, the behavior of the users is observed incooperation with a delivery rejection condition registration unit of the mail server 61. The "observation of the behavior of the users" means observing whether each user registers with the mail server 61 for delivery rejection regarding, for example, the source address or domain name. For example, if a plurality of users have registered for the delivery rejection even though the mail delivery was carried out based on the comprehensive judgment "rank 0", the accumulation condition, the judgment rules and the judgment rule application condition may be altered to stricter ones. Observation on whether the users replied to the delivered mails or not may also be added to the observation of the behavior of the users. After the behavior observation (S017), the process from the mail reception (S001) may be continued.

It is also possible to collect statistics on the user behavior, regard a classified group as undesirable emails when prescribed conditions are satisfied, and thereafter process emails transferred via the relay path, etc. of the classified group as undesirable emails. For example, on an assumption that it takes T=28800 seconds for example for 50% of the users to recognize a delivered undesirable email as an undesirable email (from the delivery of the undesirable email), each delivered email may be regarded and processed as an undesirable email when the percentage of users (receivers) registering for the delivery rejection within the time T (from the delivery of the email) exceeds n % (3%, for example) of the whole users.

For emails of the classified groups judged "rank 2", prescribed mail processes are carried out as explained below (S014). Incidentally, for the classified groups judged "rank 2", that is, for emails transferred through the relay paths judged "rank 2", the prescribed mail processes may be carried out also to emails that are received thereafter. As the prescribed mail processes, the mail processing server 51 can execute (1) delivery blockage, (2) transmission of pseudo error, (3) deletion, (4) blockage of undelivery undeliverable mails, (5) warning, (6) collection of evidence, (7) transmission after confirmation, etc.

The "(1) delivery blockage" means blockage of the delivery of the emails of the classified groups of "rank 2" to the mail server 61, that is, blocking the emails from reaching the users.

The "(2) transmission of pseudo error" means transmission of a pseudo error message (replicating an "undeliverable mail" which is generally returned by the mail server to the source when an email transmitted by the source is undeliverable) to the sources of the emails of the classified groups judged as undesirable emails. There are cases where the source of undesirable emails improves the effectiveness of its own destination address database by checking whether or not the undeliverable mail is returned from the destination. By returning the pseudo error message to the source of the undesirable emails, the source's advantage of maintaining such a database can be eliminated and thereby the degree of annoyance of users by the undesirable emails can be reduced.

The "(3) deletion" means deletion of the emails accumulated in the classified groups judged "rank 2".

The "(4) blockage of undeliverable mails" is a process assuming that the mail delivery to the users is carried out in principle, in which when the undeliverable mail is transmitted by the mail server 61 to the source due to invalidity of the destination address, etc., the undeliverable mail is received by the mail processing server 51 and deleted so as to block the undeliverable mail from being returned to the source. By the process, analysis of the contents of the header message (relay path, etc.) of the undeliverable mail by the source of the undeliverable mail can be prevented.

The "(5) warning" means transmission of a warning message to the source of the undesirable emails.

The "(6) collection of evidence" means recording of the undesirable emails themselves or information on the undesirable emails. It is desirable that this process "(6) collection of evidence" be carried out without executing the "(1) delivery blockage". Proofs of the existence of the undesirable emails can be gained afterward.

The "(7) transmission after confirmation" means processing the emails judged "rank 2" after inquiring of the users how to handle the emails. For example, only the contents of the header message of the mail judged "rank 2" is sent to the user and the mail is delivered to the user only when the user permits the delivery.

As is understood from the above explanation, the mail processing server 51 can selectively execute various processes (that are different from those executed by general mail servers) as the prescribed mail processes, depending on whether there exists the user of the destination address or not as shown in the following Table 2.

TABLE 2

| USER | OPERATION |
| --- | --- |
| EXISTING | PRETEND THAT USER DOES NOT EXIST (TO SOURCE) (E.G., RETURN PSEUDO ERROR MESSAGE) |
| EXISTING | DELETE STORED MAIL WITHOUT TRANSMITTING ANYTHING TO SOURCE |
| NOT EXISTING | BLOCK UNDELIVERABLE MAIL FROM BEING RETURNED TO SOURCE |

It is to be understood that the above prescribed mail processes for undesirable emails may either be executed independently or in combination properly. While the above prescribed mail processes have been described by way of illustration, modification of the contents of the prescribed mail processes, addition of various mail processes other than the above examples, etc. are also possible.

For example, it is possible to employ a configuration rejecting the DNS (Domain Name Service) in cooperation with a domain name server in charge of the domain of the destination mail server 61 so as to prevent the source mail server 13 of the undesirable emails from acquiring the address of the destination mail server 61.

It is also possible to disable the IP connection by letting the mail processing server 51, etc. reject connections from the IP address of the source (source terminal, source mail server, etc.). Incidentally, after the mail processes of the step S014 are finished, the process from the mail reception (S001) may be continued.

Figure 3:
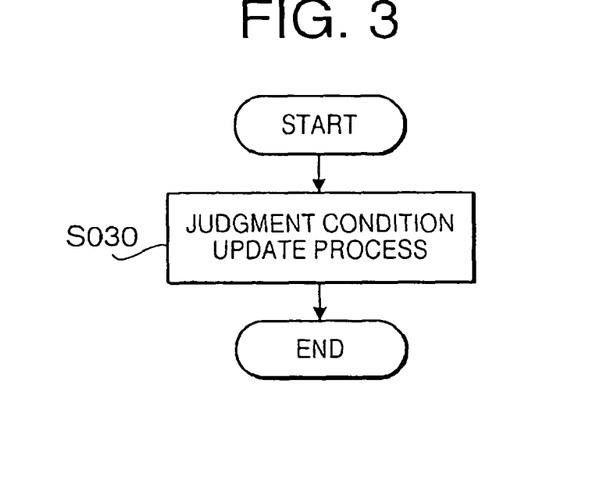
FIG. 3 is a flow chart showing an update process for updating judgment conditions.

FIG. 3 shows an update process for the comprehensive judgment rule C31 and the judgment rule application condition C21 (step S030). The update process may be carried out by the administrator of the mail processing server 51, etc. via a user interface, or automatically based on statistics on the results of the comprehensive judgment. For example, the ratio of the number of the emails judged "rank 2" to the total number of received mails may be obtained and the comprehensive judgment rule C31, the judgment rule application condition C21, etc. may be altered so that the ratio will be a prescribed ratio. In this case, the judgment on the undesirable emails can be adjusted flexibly in consideration of actual status of occurrence of the undesirable emails (the feeling of "annoyance" of the users, the social situation, etc.). The update process (S030) may also be configured to further allow the alteration of the accumulation condition C11 and the exceptional rules C51.

Figure 4:
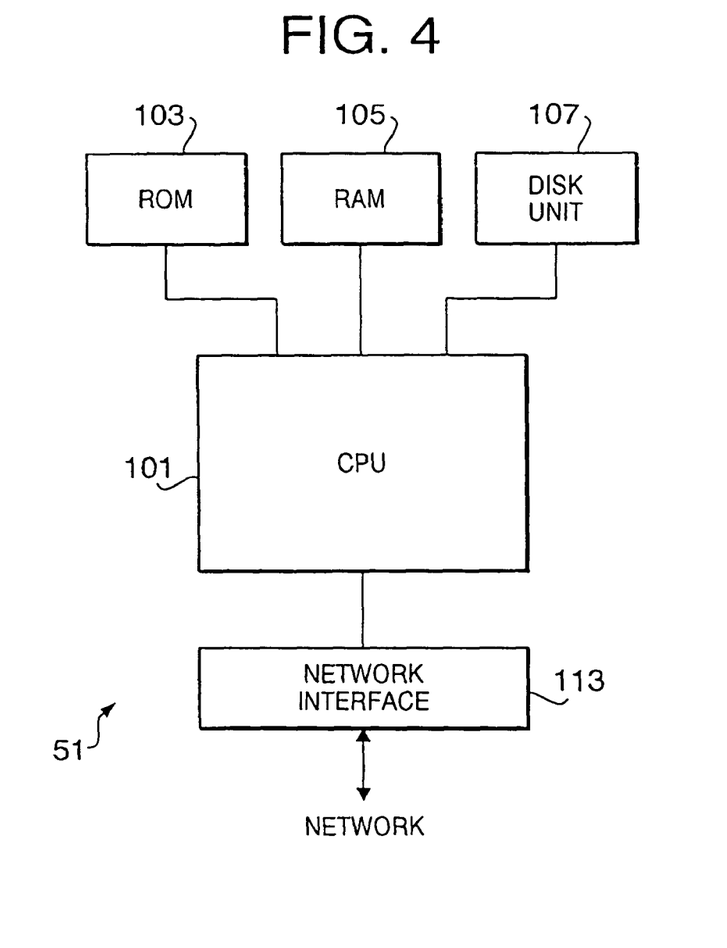
FIG. 4 is a block diagram showing a configuration of a mail processing server.

FIG. 4 shows a general configuration of a server device which is usable as the mail processing server 51. As shown in FIG. 4, the mail processing server 51 is configured by connecting a RAM 105, a ROM 193, a disk unit 107, a network interface 113, etc. to a CPU 101. Communication with other devices connected to the network is carried out via the network interface 113. Programs for implementing the processes for emails which have been shown in FIGS. 2 and 3 are stored in the disk unit 107. The programs are read out of the disk unit 107 and executed by the CPU 101.

While the above embodiment of the present invention has been described referring to its various features, a variety of modifications of the embodiment can be formed by properly omitting, modifying or replacing the above features. For example, while the mail processing server 51 is configured as a special-purpose server placed between the mail server 61 and the gateway 41 in the above embodiment, the functions of the mail processing server 51 may be incorporated into another server such as the mail server 61. It is also possible to let a plurality of server devices execute the steps shown in FIG. 2 in cooperation.

The functions of the mail processing server 51 (FIG. 2, FIG. 3) may also be implemented in a special-purpose device of a smaller size, for example.

The present invention is of course applicable not only to push-type mail delivery but also to pull-type mail delivery.

The sequence of steps shown in FIG. 2 from the accumulation of emails to the prescribed mail processes, etc. may be executed repeatedly and constantly as described in the above embodiment; however, the sequence may also be carried out periodically, or with arbitrary timing by the administrator. It is also possible to basically omit the delivery blockage, not to accumulate the emails themselves in the step S003 but to copy data of all or part of the emails, and to make the judgment on whether undesirable emails or not periodically (every day, every month, etc.) regarding the accumulated copy data.

While a fixed judgment rule application condition is applied to each of the classified groups in the above embodiment, the judgment rule application condition may also be applied to each of more finely classified groups (each source mail server, each user, etc.).

While emails transferred from the source to the destination mail server are received one way and the classification/accumulation and judgment are carried out in the above embodiment, the judgment on whether undesirable emails or not can also be made similarly by receiving the undeliverable mails returned from the destination mail server to the source and carrying out the classification/accumulation and judgment.

Modifications of the aforementioned judgment rules (j1-j6) are also possible. For example, the judgment rule j2 employs an absolute criterion (the number of undeliverable mails per unit time), a relative criterion (e.g., percentage of the number of undeliverable mails to the total number of received mails in a classified group) can also be employed instead of such an absolute criterion.

The comprehensive judgment (S007) can also be modified in various ways. For example, while the comprehensive judgment is made in terms of three ranks (rank 0, rank 1 and rank 2) in the above embodiment, the number of ranks may be increased or decreased to 2 (rank 0 and rank 2). While the ranking in the comprehensive judgment (S007) is made based on the number of "obeyed" judgment rules in the above embodiment, ranking by as signing specific weights to some of the judgment rules is also possible.

As mentioned before, undesirable emails have the tendency to be transmitted in large quantity at once by the same source and some senders of undesirable emails transmit the emails hiding the source address in the header message. In this meaning, the information on the relay path (the aforementioned classification rule "b1. relay path") is highly effective as a classification rule for specifying a group of emails having a high probability of having been transmitted by the same source. It is obvious that not only the aforementioned relay path information like "relay path A→B→C→D" but also other information on the relaying of email, such as part of the relay path information and information on relay devices (the aforementioned classification rule b2, server name and domain name of each relay device), are effective as classification rules for specifying a group of emails having a high probability of having been transmitted by the same source. When information on the source (the aforementioned classification rule b3, domain name and address of the source) is contained in the header message, the use of the source information as the classification rule is effective as a matter of course.

In addition to the information on the source and the relaying of email, a variety of information contained in emails (subject (title) of the mail, keywords in the text, content of the attached file, etc.) can be used as classification rules for specifying a group of emails having a high probability of having been transmitted by the same source. For example, by classifying emails by use of information on the source such as a URL contained in the mail text, a group of emails having a high probability of having been transmitted by the same source can be specified. Particular characteristic expressions contained in emails are also usable for specifying the source in some cases.

In cases where particular information such as the source address is not described in the header message, the fact can be used as information indicating that the source address is concealed. Such information indicating the concealment of the source address (as information to be contained in the mail) can also be used as a classification rule for specifying a group of emails having a high probability of having been transmitted by the same source, if such concealment is being practiced by senders of particular undesirable emails.

As above, after groups of emails having a high probability of having been transmitted by the same source are found and classified, whether emails in each of the classified groups are undesirable emails or not can be judged by use of a prescribed algorithm (e.g., whether or not the number of received emails per unit time is a prescribed number or more) for each classified group. As the prescribed algorithm, not only the judgment rules j1-j6 explained in the above embodiment but also other algorithms based on properties of undesirable emails can be employed. The judgment rules j1-j6 may either be used independently or in combination as in the above embodiment. Other algorithms may also be used in addition to the judgment rules j1-j6.

In cases where the source of undesirable emails is successively generating mail addresses by a computer, etc., classification by the length of the destination address is also possible. When the sender of undesirable emails is transmitting large numbers of emails of the same contents, the whole length of each mail may be partitioned into parts of a proper length (e.g. 32 bytes) and the partitioned parts may be classified.

Other than such information for specifying a group of emails having a high probability of having been transmitted by the same source, emails can contain information or contents exhibiting properties usable for specifying undesirable emails. For example, when particular expressions, etc. suggesting the probability of an undesirable email is contained in the subject, text, etc., such emails can be classified and accumulated and whether they are undesirable emails or not can be judged by applying one of the aforementioned prescribed algorithms (e.g., whether or not the number of received emails per unit time is a prescribed number or more). Incidentally, when particular expressions, etc. obviously characterizing an undesirable email are contained in the subject, text, etc., such emails may be judged as undesirable emails and handled as the targets of the prescribed mail processes such as the delivery blockage.

As above, by classifying and accumulating received emails based on prescribed information contained in the emails and applying a prescribed algorithm to each of the classified groups, whether the emails are undesirable emails or not can be judged effectively.

Incidentally, in the above explanation, from the viewpoint of preventing damages to the users by the undesirable emails, part of the judgment rules for the judgment on undesirable emails and part of the prescribed mail processes include processes like deletion, opening, etc. of the emails. It is desirable that such processes be carried out legitimately according to contracts, etc. made with the users, and the embodiments of the present invention can be configured to meet such requirements.

As described above, according to the present invention, undesirable emails can be judged and found securely and the undesirable emails can be handled as the targets of the mail processes such as the delivery blockage by a server device, etc., by which damages to the users caused by undesirable emails can be prevented effectively. There is no need of intervention by the users for preventing the reception of the undesirable emails. Therefore, the present invention is of great benefit to the users.

The functions of processing emails which have been explained referring to or relating to FIGS. 2 and 3 can be implemented by a program that is executed by a computer. The program can be stored in a computer-readable record medium to be read and executed by a computer. Programs implementing the aforementioned functions of processing emails when executed by a computer, and record mediums storing the programs are also within the scope of the present invention.

While the present invention has been described with reference to the particular illustrative embodiments, the present invention is not to be restricted by those embodiments, but it should be understood based on the appended claims.

What is claimed is:

1. An email processing method for selecting emails of a prescribed type undesirable to users and processing the selected emails, comprising the steps of:

receiving each email at a point on a path from a source of the email to a user;

classifying and accumulating received e-mails based on two or more classification rules, wherein the two or more classification rules that are used to classify received e-mails include:

a relay path, wherein the relay path includes a relay order in which an e-mail is relayed from a source terminal to a destination terminal through one or more relay devices; and names of one or more relay devices regardless of the relay order in which an e-mail is relayed through the one or more relay devices; and judging whether the emails accumulated in each of classified groups are emails of the prescribed type or not according to a prescribed algorithm, wherein the emails accumulated in one classified group of emails being judged were classified based on relay path, wherein the relay path includes relay order in which an e-mail is relayed from a source terminal to a destination terminal through one or more relay devices; and wherein the emails accumulated in another classified group of emails being judged were classified based on names of one or more relay devices regardless of the relay order in which an e-mail is relayed through the one or more relay devices.

2. The email processing method according to claim 1, wherein another classification rule includes information for specifying a group of emails as having been transmitted by the same source.

3. The email processing method according to claim 1, wherein the names of one or more relay devices include server names or domain names of relay devices on relay paths of the emails, and the classification is made by the server names or domain names.

4. The email processing method according to claim 1, wherein the judgment on whether emails of the prescribed type or not according to a prescribed algorithm includes ranking of the emails in regard to whether emails are of the prescribed type or not.

5. The email processing method according to claim 4, further comprising the step of executing different processes to the emails of different classified groups, respectively, depending on the result of the ranking.

6. The email processing method according to claim 4, wherein the emails of each of the classified groups are ranked by the prescribed algorithm among three ranks: emails of the prescribed type, emails that might be of the prescribed type, and normal emails.

7. The email processing method according to claim 4, wherein the number of ranks in the ranking is variable.

8. The email processing method according to claim 4, wherein the prescribed algorithm includes threshold values corresponding to the ranks to be used as criteria for ranking the emails of each of the classified groups, and the threshold values are variable.

9. The email processing method according to claim 1, wherein the prescribed algorithm is alterable.

10. The email processing method according to claim 1, wherein the prescribed algorithm includes judgment on whether or not the emails accumulated in each of the classified groups satisfy each item of a judgment rule containing at least one of the following items:
(1) the number of received emails per unit time is a first threshold or more, or
(2) the number of emails having an invalid destination address is a second threshold or more, and judges whether the emails of each of the classified groups are emails of the prescribed type or not based on the result of the judgment.

11. The email processing method according to claim 1, wherein the prescribed algorithm includes judgment on whether or not the emails accumulated in each of the classified groups satisfy each item of a judgment rule containing at least one of the following items:
(1) the number of received emails per unit time is a first threshold or more,
(2) the number of emails having an invalid destination address is a second threshold or more,
(3) the source address is invalid,
(4) the degree of difference of the destination address between emails in the classified group is a third threshold or more,
(5) the mail text contains prescribed contents, and
(6) the mail text contains a prescribed URL,
and judges whether the emails of each of the classified groups are emails of the prescribed type or not based on the result of the judgment.

12. The email processing method according to claim 11, wherein the degree of difference of the destination address in the item (4) of the judgment rule is calculated based on Hamming distance between destination address codes.

13. The email processing method according to claim 1, further comprising the step of continuing the reception, classification and accumulation of the emails until an accumulation condition, specifying at least one of accumulation time and the number of accumulated emails, is satisfied.

14. The email processing method according to claim 1, further comprising:
for an email judged to be of the prescribed type, preventing transmission of information to the source of the email, the information being information on the user at the destination of the email.

15. The email processing method according to claim 1, further comprising the step of executing a process including at least one of the following items for the emails judged to be of the prescribed type:
(a) blockage of delivery to the user,
(b) transmitting a pseudo error message, replicating an undeliverable mail which is returned by a mail server to the source when undeliverable, to the source,
(c) deletion,
(d) blocking an undeliverable mail from being returned to the source when the undeliverable mail is transmitted by a prescribed mail server,
(e) transmitting a warning message to the source,
(f) preserving information on the emails of the classified group,
(g) inquiring of each user whether to deliver each email of the classified group or not and processing the email according to a reply of the user to the inquiry,
(h) rejection of domain name service regarding a prescribed mail server requested by a device corresponding to the source of the emails of the classified group, and
(i) rejection of requests for connection to a prescribed mail server made from the IP address of a device corresponding to the source of the emails of the classified group.

16. The email processing method according to claim 1, wherein the emails include undeliverable mails each of which is transferred from a prescribed mail server to the source when an email to a user at the destination is undeliverable.

17. An email processing method, comprising the steps of:
receiving emails while classifying and accumulating the received emails based on two or more classification rules, wherein the two or more classification rules that are used to classify received e-mails include:
a relay path, wherein the relay path includes a relay order in which an e-mail is relayed from a source terminal to a destination terminal through one or more relay devices; and
names of one or more relay devices regardless of the relay order in which an e-mail is relayed through the one or more relay devices;
continuing the reception, classification and accumulation of the emails until an accumulation condition, specifying at least one of accumulation time and the number of accumulated emails, is satisfied;
judging whether or not the emails accumulated in each of classified groups satisfy each item of a judgment rule containing at least one of:
(1) the number of received emails per unit time is a first threshold or more,
(2) the number of emails having an invalid destination address is a second threshold or more,
(3) the source address is invalid,
(4) the degree of difference of the destination address between emails in the classified group is a third threshold or more,
(5) the mail text contains prescribed contents, and
(6) the mail text contains a prescribed URL according to a judgment rule application condition specifying which items of the judgment rule should be applied,
wherein the emails accumulated in one classified group of emails being judged were classified based on relay path, wherein the relay path includes relay order in which an e-mail is relayed from a source terminal to a destination terminal through one or more relay devices; and
wherein the emails accumulated in another classified group of emails being judged were classified based on names of one or more relay devices regardless of the relay order in which an e-mail is relayed through the one or more relay devices;
judging whether or not each of the classified groups obeys a comprehensive judgment rule which employs the number of satisfied items of the judgment rule in the items specified by the judgment rule application condition as its condition of judgment; and
executing a prescribed mail process including at least one of the following items for the emails of the classified groups judged to obey the comprehensive judgment rule:
(a) blockage of delivery to the user, and
(b) transmitting a pseudo error message, replicating an undeliverable mail which is returned by a mail server to the source when undeliverable, to the source.

18. The email processing method according to claim 17, further comprising the steps of:
collecting statistics on the result of the judgment on the comprehensive judgment rule by executing the sequence of processes described in the email processing method at least once; and
setting or altering contents of at least one of the accumulation condition, the judgment rule, the judgment rule application condition and the comprehensive judgment rule depending on the collected statistics.

19. The email processing method according to claim 17, further comprising the step of receiving input for setting or altering contents of at least one of the accumulation condition, the judgment rule, the judgment rule application condition and the comprehensive judgment rule via a user interface.

20. The email processing method according to claim 17, wherein classified groups corresponding to a prescribed exceptional rule are excluded from the targets of the prescribed mail process even when the classified groups obey the comprehensive judgment rule.

21. The email processing method according to claim 20, wherein the prescribed exceptional rule includes at least one of the address of a source to be excepted, the domain name of a source to be excepted, a time slot in which the prescribed mail process is not executed, and a time period in which the prescribed mail process is not executed.

22. The email processing method according to claim 17, further comprising the steps of:
acquiring a delivery rejection condition, containing at least one of a domain name and a source address for rejecting email delivery, from a prescribed server when a user has registered the delivery rejection condition with the prescribed server; and
determining classified groups as the targets of the prescribed mail process based on the acquired delivery rejection condition.

23. The email processing method according to claim 17, wherein:
the number of satisfied items of the judgment rule in the items specified by the judgment rule application condition is defined in the comprehensive judgment rule as a factor for ranking, and
each of the classified groups is ranked according to the comprehensive judgment rule so that the rank will become higher as the number of satisfied items of the judgment rule gets larger, and
the prescribed mail process is executed at least for emails of a classified group that is ranked among the highest rank by the ranking.

24. The email processing method according to claim 23, wherein the accumulation condition is altered and the sequence of processes described in the email processing method is continued further for at least one classified group that is not ranked among the highest rank by the ranking.

25. A server device for selecting emails of a prescribed type undesirable to users and processing the selected emails, comprising:
a network interface configured to receive emails;
a disk unit having stored thereon programs having:
a mail classification unit for classifying and accumulating the received emails based on two or more classification rules, wherein the two or more classification rules that are used to classify received e-mails include:
a relay path, wherein the relay path includes a relay order in which an e-mail is relayed from a source terminal to a destination terminal through one or more relay devices; and
names of one or more relay devices regardless of the relay order in which an e-mail is relayed through the one or more relay devices;
a judgment unit for judging whether the emails accumulated in each of classified groups are emails of the prescribed type or not according to a prescribed algorithm,
wherein the emails accumulated in one classified group of emails being judged were classified based on relay path, wherein the relay path includes relay order in which an e-mail is relayed from a source terminal to a destination terminal through one or more relay devices; and wherein the emails accumulated in another classified group of emails being judged were classified based on names of one or more relay devices regardless of the relay order in which an e-mail is relayed through the one or more relay devices; and an email processing unit for executing a process based on the result of the judgment;

and a central processing unit configured to execute the programs stored on the disk unit.

26. A non-transitory computer-readable record medium storing a program for instructing a computer to implement:

a classification function for classifying and accumulating received emails based on two or more classification rules, wherein the two or more classification rules that are used to classify received e-mails include:

a relay path, wherein the relay path includes a relay order in which an e-mail is relayed from a source terminal to a destination terminal through one or more relay devices; and names of one or more relay devices regardless of the relay order in which an e-mail is relayed through the one or more relay devices;

a judgment function for judging whether the emails accumulated in each of classified groups are emails of the prescribed type or not according to a prescribed algorithm, wherein the emails accumulated in one classified group of emails being judged were classified based on relay path, wherein the relay path includes relay order in which an e-mail is relayed from a source terminal to a destination terminal through one or more relay devices; and wherein the emails accumulated in another classified group of emails being judged were classified based on names of one or more relay devices regardless of the relay order in which an e-mail is relayed through the one or more relay devices; and an email processing function for executing a process based on the result of the judgment.

* * * * *

UNITED STATES PATENT AND TRADEMARK OFFICE
CERTIFICATE OF CORRECTION

PATENT NO.        : 8,176,125 B2
APPLICATION NO.   : 10/505064
DATED             : May 8, 2012
INVENTOR(S)       : Toshihiko Yamakami It is certified that error appears in the above-identified patent and that said Letters Patent is hereby corrected as shown below:

On the title page, item [54] and Column 1, line 1, in the title, delete "USER" and insert --USERS--.

Signed and Sealed this
Thirtieth Day of October, 2012

David J. Kappos
*Director of the United States Patent and Trademark Office*